The specification is not in print.
9859X
PATENTED JULY 1, 1836.
O. WYMAN.
GRINDING MILL.
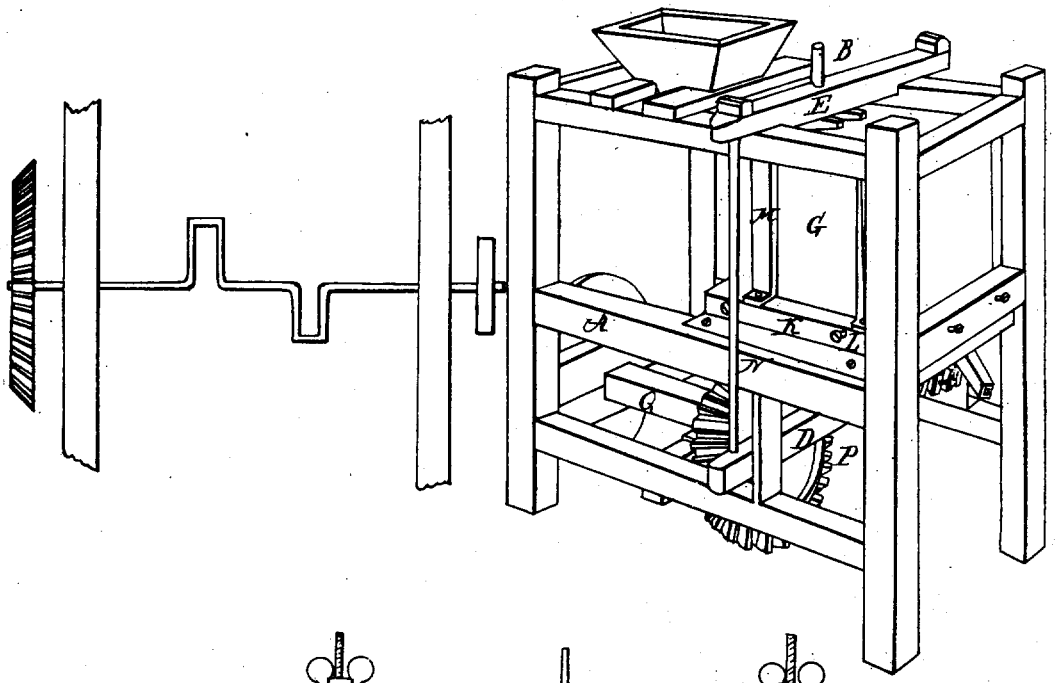
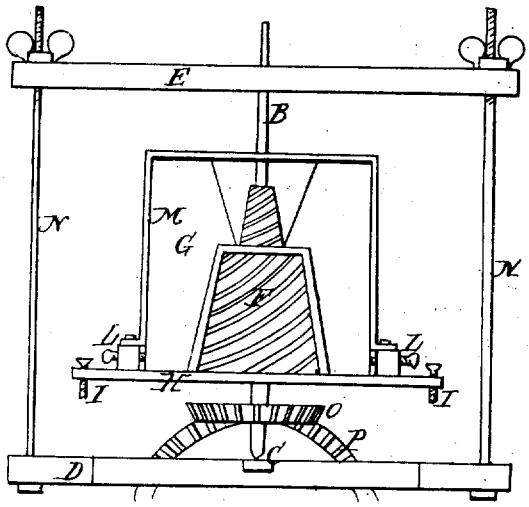
THE NORRIS PETERS CO. PHOTO-LITHO. WASHINGTON, D. C.

9859x July 1, 1836

Oliver Wyman of Watertown Massachusetts

Letters Patent.

The Schedule referred to in these Letters Patent and making part of the same containing
a description in the words of the said Oliver Wyman himself of his improvement in
the Mill for Grinding Grain and other Substances.

Be it known, that I Oliver Wyman of Watertown in the County of Middlesex
and State of Massachusetts have invented an improvement in the machine for grinding grain
and other substances, called "Wyman's improved Mill for grinding" which is described as
follows reference being had to the annexed drawings of the same making part of this spe-
cification. This machine consists of a suitable frame A of sufficient size and
strength to contain and support the machinery hereafter described, in or on one side of
which is a vertical spindle B turning horizontally with its lower end in a [illegible] metallic
box or oil cup C let into a bridge tree D its upper end turning in a round aperture
in the cap piece E of the frame. On this spindle is fastened a conical [struck out] F cut into
flutes or channels spirally around its circumference which runner is surrounded by a
hollow conical bed G made in two parts resting on a platform H supported and regu-
lated by four screws I passing through the joists of the frame to raise or lower the platform
. Around the bottom of the bed is a square curb or frame K through which screws L
pass horizontally for regulating the bed in increasing or diminishing the distance between
the bed and runner for grinding coarser or finer as required. Two or three wrought iron dogs
M pass over the bed and are bolted to the platform for securing the bed stones firmly to the
platform. The runner is raised or lowered by an iron screw rod N passing through the
cap and through one end of the bridge tree. The other end of the bridge tree turning on a
bolt or pin on the opposite side of the frame or a screw rod may be used at each end
of the bridge tree for raising it. The runner is to be turned by a bevil pinion O on the
spindle into which works a bevil wheel P on the end of a horizontal shaft Q and on
the other end of which shaft is a driving pulley R turned by any convenient power
required, or the runner may be turned by levers and treadles by manual power having
cranks on the horizontal shaft connected to the ends of the treadles by connecting rods.
A hopper and shoe of the usual construction are placed on the top of the frame by which
the machine is fed. In order to break grain [illegible] [illegible] or other substances
before passing to the runner of the Mill and then crushing is made use of shaped conical
by 9859x July 1, 1836 with projections formed on its circumference having a square opening in its centre which is slipped over the spindle, the [illegible] being cut [illegible] shape — to admit said breaker & allow it to play around freely. The materials and dimensions of the parts of this machine may be varied to suit circumstances.

What I claim as my invention and which I desire to secure by Letters Patent consists in the before described machine for grinding Grain and other substances.

Witnesses
Wm. P. Elliot
D. [illegible] Mordell

Oliver Wayman

Drawing 592 wor